US011782287B2

(12) United States Patent
Eddington et al.

(10) Patent No.: US 11,782,287 B2
(45) Date of Patent: Oct. 10, 2023

(54) SHAPE MEMORY ALLOY ACTUATOR BEARINGS

(71) Applicant: CAMBRIDGE MECHATRONICS LIMITED, Cambridge (GB)

(72) Inventors: Robin Eddington, Cambridge (GB); James Howarth, Cambridge (GB)

(73) Assignee: CAMBRIDGE MECHATRONICS LIMITED, Cambridgeshire (GB)

( * ) Notice: Subject to any disclaimer, the term of this patent is extended or adjusted under 35 U.S.C. 154(b) by 671 days.

(21) Appl. No.: 16/759,971

(22) PCT Filed: Oct. 30, 2018

(86) PCT No.: PCT/GB2018/053135
§ 371 (c)(1),
(2) Date: Apr. 28, 2020

(87) PCT Pub. No.: WO2019/086855
PCT Pub. Date: May 9, 2019

(65) Prior Publication Data
US 2020/0277941 A1 Sep. 3, 2020

(30) Foreign Application Priority Data
Oct. 30, 2017 (GB) ..................... 1717855

(51) Int. Cl.
*G02B 27/64* (2006.01)
*F03G 7/06* (2006.01)
(Continued)

(52) U.S. Cl.
CPC ........... *G02B 27/646* (2013.01); *F03G 7/065* (2013.01); *F16B 1/0014* (2013.01); *F16F 1/027* (2013.01); *G02B 7/08* (2013.01); *F03G 7/0614* (2021.08); *F03G 7/06143* (2021.08); *F05C 2251/08* (2013.01); *G03B 2205/0076* (2013.01)

(58) Field of Classification Search
CPC ......... G02B 27/646; G02B 7/08; F03G 7/065; F03G 7/0614; F03G 7/06143; F16B 1/0014; F16F 1/027; F05C 2251/08; G03B 2205/0076
USPC ......... 359/554–557; 396/52, 55; 348/208.99, 348/208.4
See application file for complete search history.

(56) References Cited

U.S. PATENT DOCUMENTS 9,541,769 B2   1/2017   Severinghaus
2009/0051776 A1 2/2009   Wernersson
(Continued)

FOREIGN PATENT DOCUMENTS

CN   101668947 A   3/2010
CN   101784955 A   7/2010
(Continued)

OTHER PUBLICATIONS

Office Action of Chinese Application No. 201880070923.0 dated Jun. 15, 2022.

*Primary Examiner* — Hoang M Nguyen
(74) *Attorney, Agent, or Firm* — Haley Guiliano LLP

(57) ABSTRACT

Embodiments of the present techniques provide methods for assembling and manufacturing shape memory alloy (SMA) actuator assemblies, which may also advantageously simplify the process of, speed-up the process of and/or reduce the cost of manufacturing SMA actuator assemblies.

48 Claims, 9 Drawing Sheets

(51) Int. Cl.
*F16B 1/00* (2006.01)
*F16F 1/02* (2006.01)
*G02B 7/08* (2021.01)

(56) References Cited

U.S. PATENT DOCUMENTS

| | | |
|---|---|---|
| 2012/0174572 A1 | 7/2012 | Clausi et al. |
| 2016/0154252 A1* | 6/2016 | Miller ................... G02B 7/02 359/557 |
| 2016/0227088 A1* | 8/2016 | Brown ................... G03B 5/00 |
| 2017/0075192 A1* | 3/2017 | Brown ................ H04N 23/687 |
| 2017/0357076 A1* | 12/2017 | Scheele ................ G02B 7/026 |

FOREIGN PATENT DOCUMENTS

| | | |
|---|---|---|
| WO | 2007113478 A1 | 10/2007 |
| WO | WO 2008099156 | 8/2008 |
| WO | 2016189314 A1 | 12/2016 |
| WO | WO 2017055788 | 4/2017 |
| WO | WO 2017072525 | 5/2017 |

* cited by examiner (A)

(B)

SHAPE MEMORY ALLOY ACTUATOR BEARINGS

CROSS-REFERENCE TO RELATED APPLICATIONS

This application is a national stage application under 35 U.S.C. § 371 of International Application PCT/GB2018/053135, filed Oct. 30, 2018, which claims priority of GB Patent Application 1717855.9 filed Oct. 30, 2017. The disclosure of which are hereby incorporated by reference herein in their entireties.

The present application generally relates to techniques for manufacturing shape memory alloy (SMA) actuators, and in particular to techniques for providing bearings in SMA actuators.

In a first approach of the present techniques, there is provided a shape memory alloy (SMA) actuation apparatus comprising: a support structure; a moveable component supported on the support structure in a manner allowing movement of the moveable component relative to the support structure in two orthogonal directions perpendicular to a notional primary axis extending through the moveable component, the moveable component comprising a spring plate; and at least two shape memory alloy (SMA) actuator wires connected between the moveable component and the support structure and arranged to, on contraction, move the moveable component; wherein the support structure comprises a bearing sub-assembly comprising: a sacrificial body portion, and a plurality of metallic bearings arranged to allow movement of the plate of the moveable component relative to the support structure, the metallic bearings held apart by the sacrificial body portion, the sacrificial body portion being removable from the plurality of metallic bearings during manufacture/assembly of the SMA actuation apparatus.

In a second approach of the present techniques, there is provided a method for manufacturing a shape memory alloy (SMA) actuation apparatus comprising: providing a support structure, a moveable component supported on the support structure in a manner allowing movement of the moveable component relative to the support structure in two orthogonal directions perpendicular to a notional primary axis extending through the moveable component, the moveable component comprising a spring plate, and at least two shape memory alloy (SMA) actuator wires connected between the moveable component and the support structure and arranged to, on contraction, move the moveable component; providing a bearing sub-assembly on the support structure, the bearing sub-assembly comprising a sacrificial body portion, and a plurality of metallic bearings arranged to allow movement of the plate of the moveable component relative to the support structure, the metallic bearings held apart by the sacrificial body portion; attaching the plurality of metallic bearings on the support structure; and removing the sacrificial body portion from the plurality of metallic bearings, leaving the metallic bearings attached to the support structure.

In a third approach of the present techniques, there is provided a shape memory alloy (SMA) actuation apparatus comprising: a support structure; a moveable component supported on the support structure in a manner allowing movement of the moveable component relative to the support structure in two orthogonal directions perpendicular to a notional primary axis extending through the moveable component, the moveable component comprising a spring plate; and at least two shape memory alloy (SMA) actuator wires connected between the moveable component and the support structure and arranged to, on contraction, move the moveable component; wherein the support structure comprises: a support component comprising a plurality of integrated bearings arranged to allow movement of the moveable component relative to the support structure.

In a fourth approach of the present techniques, there is provided a method for manufacturing a shape memory alloy (SMA) actuation apparatus comprising: providing a first sheet of material comprising a plurality of support components, each support component comprising a plurality of integrated bearings; providing a second sheet of material comprising a plurality of conductive components; aligning the second sheet of material over the first sheet of material such that each of the conductive components is provided on top of a support component; and attaching the first sheet of material to the second sheet of material to form a plurality of support structures each comprising a conductive component attached to a support component; detaching, from the attached first and second sheets of material, a support structure; providing a moveable component supported on the support structure in a manner allowing movement of the moveable component relative to the support structure in two orthogonal directions perpendicular to a notional primary axis extending through the moveable component, the moveable component comprising a spring plate arranged to contact the integrated bearings of the support structure; and providing at least two shape memory alloy (SMA) actuator wires connected between the moveable component and the support structure and arranged to, on contraction, move the moveable component.

In a fifth approach of the present techniques, there is provided an apparatus comprising an SMA actuation apparatus of the types described herein.

The apparatus may be any one of: a smartphone, a camera, a foldable smartphone, a foldable image capture device, a foldable smartphone camera, a foldable consumer electronics device, an image capture device, a 3D sensing device or system, a consumer electronics device, a mobile computing device, a mobile electronic device, a laptop, a tablet computing device, an e-reader (also known as an e-book reader or e-book device), a computing accessory or computing peripheral device (e.g. mouse, keyboard, headphones, earphones, earbuds, etc.), a security system, a medical device (e.g. an endoscope), a gaming system, a gaming accessory (e.g. controller, headset, a wearable controller, etc.), an augmented reality system, an augmented reality device, a virtual reality system, a virtual reality device, a wearable device, a drone (aerial, water, underwater, etc.), an autonomous vehicle, and a vehicle (e.g. an aircraft, a spacecraft, a submersible vessel, a car, etc.). It will be understood that this is a non-exhaustive list of example apparatus.

The SMA actuation apparatus described herein may be used in devices/systems suitable for, for example, image capture, 3D sensing, depth mapping, aerial surveying, terrestrial surveying, surveying in or from space, hydrographic surveying, underwater surveying, scene detection, collision warning, security, medical imaging, facial recognition, augmented and/or virtual reality, advanced driver-assistance systems in vehicles, autonomous vehicles, gaming, gesture control/recognition, and robotic devices.

Preferred features are set out in the appended dependent claims.

Implementations of the present techniques will now be described, by way of example only, with reference to the accompanying drawings, in which.

Broadly speaking, embodiments of the present techniques provide methods for assembling and manufacturing shape memory alloy (SMA) actuator assemblies, which may also advantageously simplify the process of, speed-up the process of and/or reduce the cost of manufacturing SMA actuator assemblies.

A shape memory alloy (SMA) actuator assembly for actuating movement of a movable element in two dimensions perpendicular to a primary axis is described in International Patent Publications WO2013/175197 and WO2014/083318. Such actuators may be used for Optical Image Stabilization (OIS) in miniature cameras. These actuators comprise four SMA wires connected between a movable element and a fixed support. Each wire is connected at one of its ends to the movable element at a crimp (the moving crimp) and at its other end to the support structure (the static crimp). The actuator of WO2013/175197 is now described in more detail with reference to FIGS. 1A to 1C.

Figure 1:
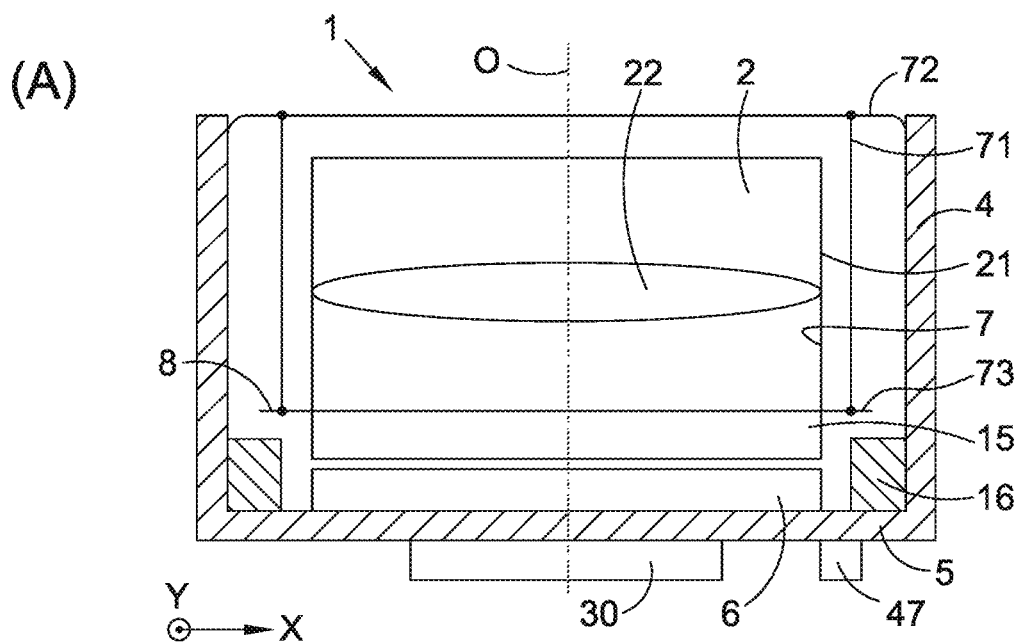
FIG. 1A shows a schematic cross-sectional view of a camera apparatus.
FIG. 1B shows a plan view of an arrangement of SMA actuator wires along the optical axis of the camera apparatus of FIG. 1A.
FIG. 1C shows a perspective view of an arrangement of SMA actuator wires in the camera apparatus of FIG. 1A.
Figure 1:
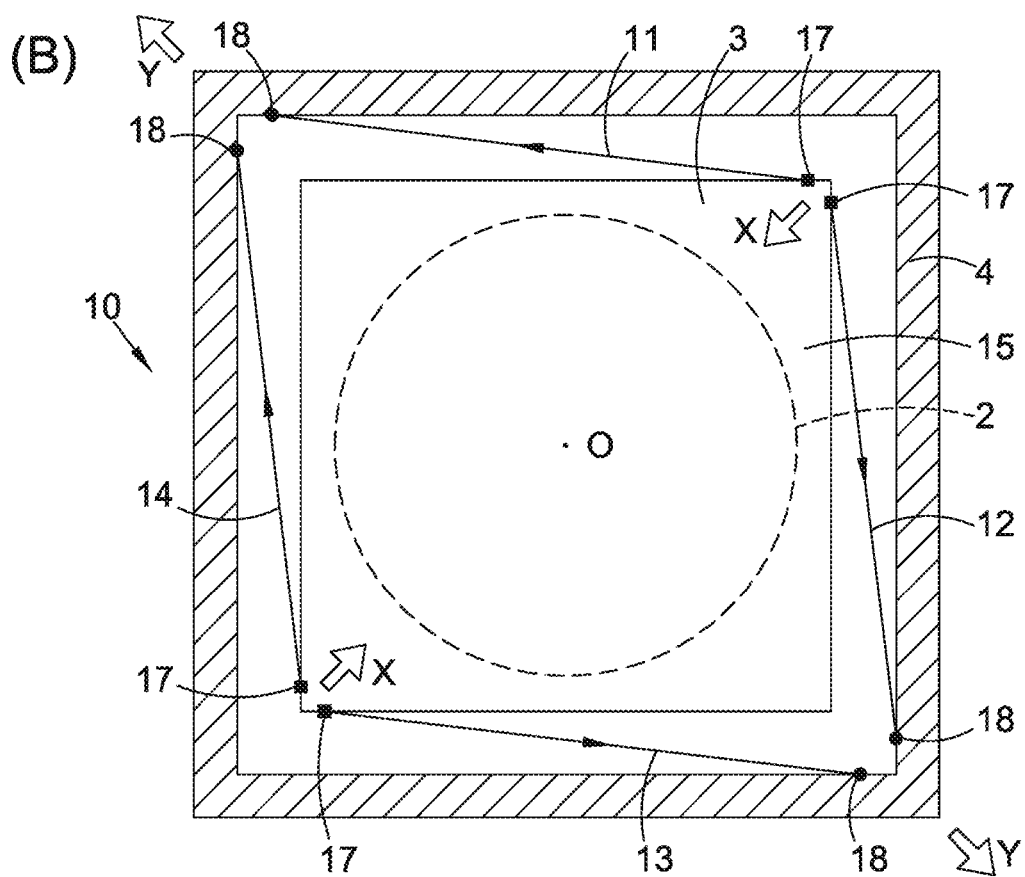
Figure 1:
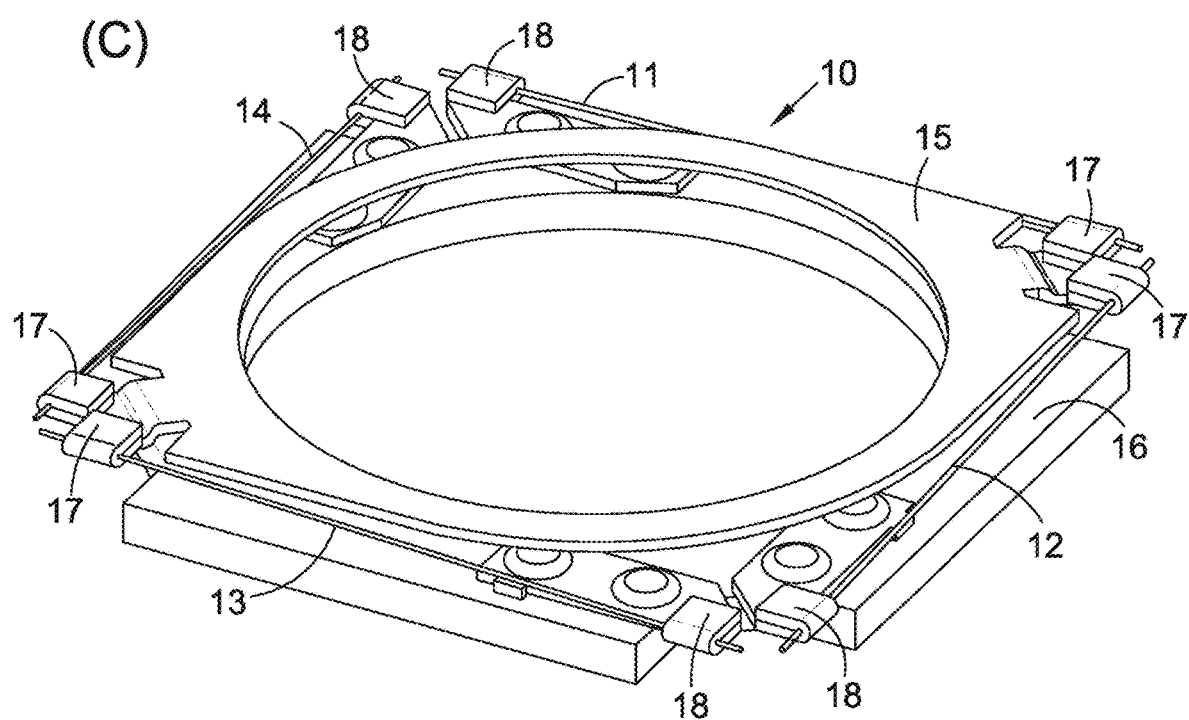

FIG. 1A shows a schematic cross-sectional view of a camera apparatus 1 that is an example of an SMA actuation apparatus, and is taken along the optical axis O (which is a notional, primary axis). In order to clearly describe the main parts of the camera apparatus 1, the SMA actuator wires are not shown in FIG. 1A, but subsequently described with reference to FIGS. 1B and 1C. The camera apparatus 1 may be incorporated into any number of devices, such as a smartphone, a foldable smartphone, a foldable image capture device, a foldable smartphone camera, a foldable consumer electronics device, an image capture device, a 3D sensing device or system, a consumer electronics device, a mobile computing device, a mobile electronic device, a laptop, a tablet computing device, an e-reader (also known as an e-book reader or e-book device), a computing accessory or computing peripheral device, a security system, a medical device (e.g. an endoscope), a gaming system, a gaming accessory, an augmented reality system, an augmented reality device, a virtual reality system, a virtual reality device, a wearable device, a drone (aerial, water, underwater, etc.), an autonomous vehicle, and a vehicle (e.g. an aircraft, a spacecraft, a submersible vessel, a car, etc.). It will be understood that this is a non-exhaustive list of example apparatus. In some cases, miniaturization is an important design criterion of the camera apparatus 1.

The camera apparatus 1 comprises a lens element 2 supported on a support structure 4 by a suspension system 7, in a manner allowing movement of the lens element 2 relative to the support structure 4 in two orthogonal directions each perpendicular to the optical axis O. Thus, the lens element 2 is a moveable element/component.

The support structure 4 is a camera support supporting an image sensor 6 on the front side of the base 5 thereof. On the rear side of the base 5 there is mounted an IC (integrated circuit) chip 30 in which the control circuit 40 is implemented, and also a gyroscope sensor 47.

The lens element 2 comprises a lens carrier 21 in the form of a cylindrical body supporting a lens 22 arranged along the optical axis O, although in general any number of lenses 22 may be provided. The camera apparatus 1 is a miniature camera in which the lens 22 (or lenses 22 if plural lenses are provided) has a diameter of less than or equal to 10 mm, more preferably less than or equal to 20 mm.

The lens element 2 is arranged to focus an image onto the image sensor 6. The image sensor 6 captures the image and may be of any suitable type, for example a CCD (charge-coupled device) or a CMOS (complimentary metal-oxide-semiconductor) device.

The lens(es) 22 may be fixed relative to the lens carrier 21, or alternatively may be supported on the lens carrier in a manner in which the lens 22 (or at least one lens 22 if plural lenses are provided) is moveable along the optical axis O, for example to provide focusing. Where the lens 22 is moveable along the optical axis O, a suitable actuation system (not shown) may be provided, for example using a voice coil motor or SMA actuator wires, such as that described in International Patent Publication No. WO2007/113478.

In operation, the lens element 2 is moved orthogonally to the optical axis O in two orthogonal directions, shown as X and Y relative to the image sensor 6, with the effect that the image on the image sensor 6 is moved. This is used to provide optical image stabilization (OIS), compensating for image movement of the camera apparatus 1, caused by, for example, hand shake.

In many known arrangements using SMA actuator wire to provide an OIS function, for example as disclosed in International Patent Publications WO2010/029316 and WO2010/089529, the OIS is provided by tilting the entire camera unit including the lens element and the image sensor, substantially as a rigid body. This method of compensating for user handshake does in principle give the best OIS performance, because aligning the lens element to the image sensor is difficult in miniature cameras and the manufacturing tolerances are very tight. In addition, the user handshake being compensated for is essentially a tilt to the camera, and so it makes intuitive sense that the compensation should also tilt the camera. However, in this example, OIS is performed differently in order to mitigate several other problems.

The first problem is that with the 'camera tilt' method, the image sensor is moving, relative to the fixed camera structure. This presents extreme difficulties in routing electrical connections from the image sensor to the fixed structure of the camera, and onto the mobile phone motherboard. Solutions to this centre around flexible printed circuits (FPCs) to route connections, but the FPC design remains challenging, owing to the large number of connections, and the high data rates. Therefore, it is highly desirable for the image sensor to remain stationary and fixed.

The second problem is that the camera tilt method implies that there is a camera structure comprising as a minimum the lens and image sensor, with support structures that must tilt inside a surrounding support structure. Because the camera has a finite footprint, the tilt of the camera means that the camera thickness (height) of the OIS camera must be greater than for an equivalent camera without OIS. In mobile phones, it is highly desirable to minimize the camera height.

The third problem is that by tilting the whole camera, it is difficult to package the tilting actuators without increasing the footprint of the camera over that of the camera without OIS.

Accordingly, in FIG. 1A the lens element 2 is moved linearly in two orthogonal directions, both perpendicular to the optical axis O which may be termed "shift" or "OIS-shift". The resulting image compensation does not entirely reverse the effects of user handshake, but the performance is deemed sufficiently good, given the constraints described above, and in particular allows the size of the camera apparatus 1 to be reduced as compared to an apparatus using tilt.

FIG. 1B shows a plan view of an arrangement of SMA actuator wires along the optical axis of the camera apparatus of FIG. 1A. Each of the SMA actuator wires 11 to 14 is arranged along one side of the lens element 2. Thus, the SMA actuator wires 11 to 14 are arranged in a loop at different angular positions around the optical axis O. Thus, the four SMA actuator wires 11 to 14 consist of a first pair of SMA actuator wires 11 and 13 arranged on opposite sides of the optical axis O and a second pair of SMA actuator wires 12 and 14 arranged on opposite sides of the optical axis O. The first pair of SMA actuator wires 11 and 13 are capable on selective driving to move the lens element 2 relative to the support structure 4 in a first direction in said plane, and the second pair of SMA actuator wires 12 and 14 are capable on selective driving to move the lens element 2 relative to the support structure 4 in a second direction in said plane transverse to the first direction. Movement in directions other than parallel to the SMA actuator wires 11 to 14 may be driven by a combination of actuation of these pairs of the SMA actuator wires 11 to 14 to provide a linear combination of movement in the transverse directions. Another way to view this movement is that simultaneous contraction of any pair of the SMA actuator wires 11 to 14 that are adjacent each other in the loop will drive movement of the lens element 2 in a direction bisecting those two of the SMA actuator wires 11 to 14 (diagonally in FIG. 1B, as labelled by the arrows X and Y).

As a result, the SMA actuator wires 11 to 14 are capable of being selectively driven to move the lens element 2 relative to the support structure 4 to any position in a range of movement in two orthogonal directions perpendicular to the optical axis O. The magnitude of the range of movement depends on the geometry and the range of contraction of the SMA actuator wires 11 to 14 within their normal operating parameters.

FIG. 1C shows a perspective view of an arrangement of SMA actuator wires in the camera apparatus of FIG. 1A. The actuator arrangement 10 comprises a total of four SMA actuator wires 11 to 14 connected between a support block 16 that forms part of the support structure 4 and is mounted to the base 5 and a movable platform 15 that forms part of the lens element 2 and is mounted to the rear of the lens plate 73 as shown in FIG. 1A.

Each of the SMA actuator wires 11 to 14 is held in tension, thereby applying a force between the movable platform 15 and the support block 16 in a direction perpendicular to the optical axis O. In operation, the SMA actuator wires 11 to 14 move the lens element 2 relative to the support block 16 in two orthogonal directions perpendicular to the optical axis O.

The SMA actuator wires 11 to 14 are connected at one end to the movable platform 15 by respective crimping members 17 and at the other end to the support block 16 by crimping members 18. The crimping members 17 and 18 crimp the wire to hold it mechanically, optionally strengthened by the use of adhesive. The crimping members 17 and 18 also provide an electrical connection to the SMA actuator wires 11 to 14. However, any other suitable means for connecting the SMA actuator wires 11 to 14 may alternatively be used.

The present techniques provide improvements to the design and assembly of such an actuator and camera module.

To enable the moveable component of the above-described actuator to move relative to the support structure, bearings are provided between the support structure and moveable component. Ball bearings may be used to enable the movement of the moveable component. Alternatively, plain bearings may be provided on the support structure to enable the movement of the moveable component. However, the plain bearings are typically provided as individual pieces of material that are attached to the support structure. A problem that arises when using plain bearings (also referred to as bearing surfaces) is that the individual pieces of material may be difficult to accurately place/position on the support structure. Furthermore, bearing surfaces need insulating from other conductive elements. A solution to these problems may be to form the bearing surfaces from an etched component having partially etched regions that define bearings, and using the etched component to position and attach the bearings onto the support structure. The bearings may then be cut from the etched component. Specifically, the bearings may be attached to a support component, which may be a laminate of an insulator on top of a thin structural layer. As the support component comprises an insulator, the bearings may be insulated from other conductive elements when attached to the support component.

Figure 2:
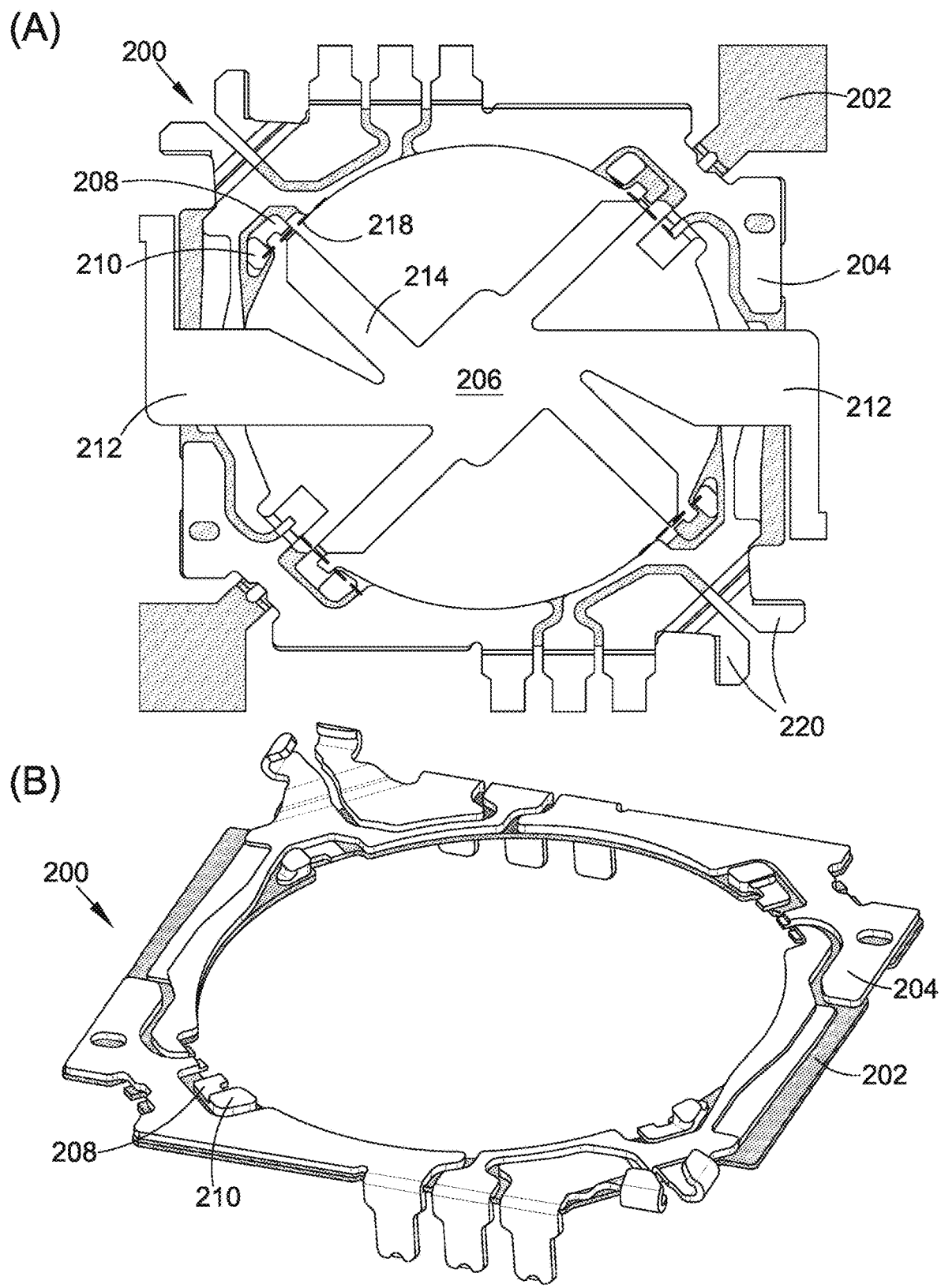
FIG. 2A shows a plan view of a bearing sub-assembly comprising a plurality of bearings, where the bearing sub-assembly is provided on a support component.
FIG. 2B shows a perspective view of bearings attached to the support component and detached from a body portion of the bearing sub-assembly.
Figure 3:
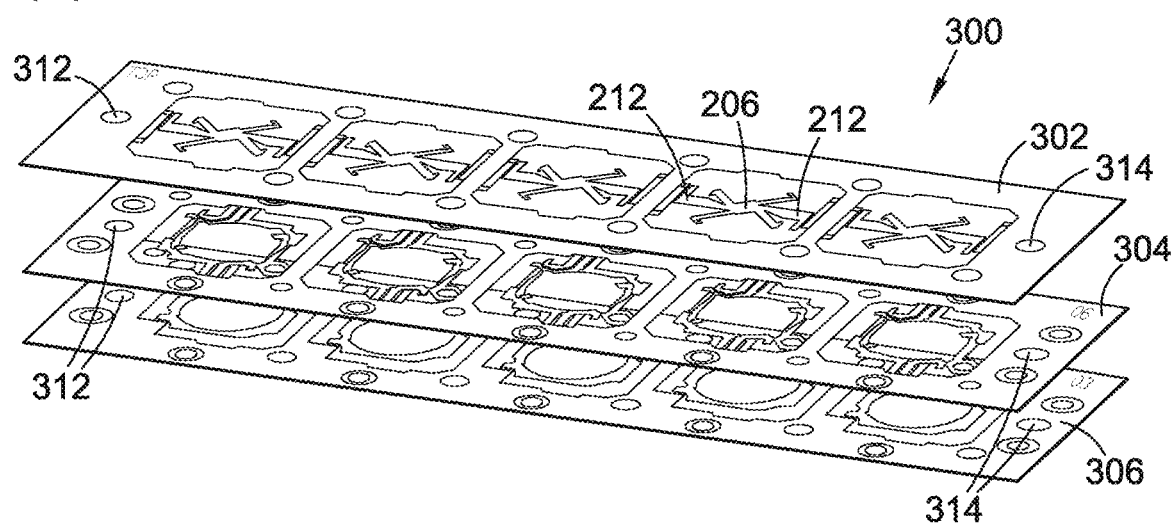
FIGS. 3A and 3B show a schematic of how the arrangement of FIG. 2B may be manufactured from sheets of material.
Figure 3:
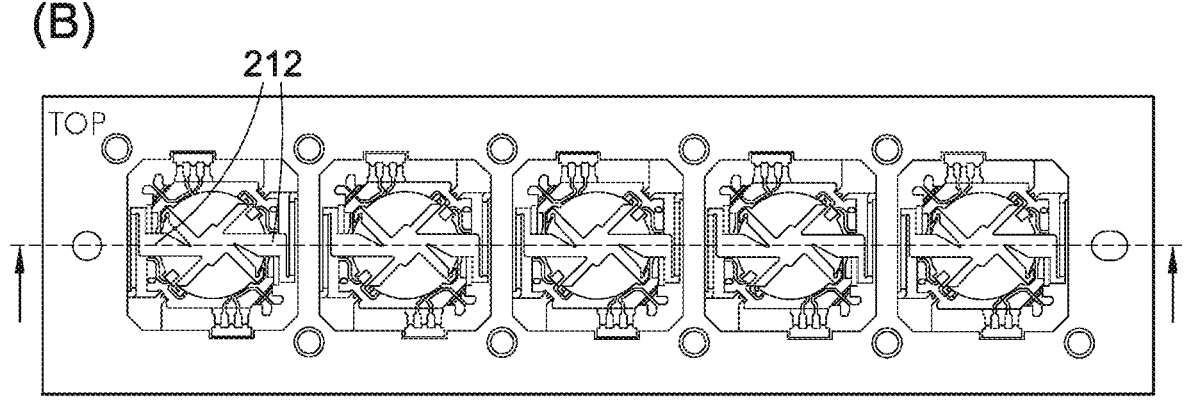

FIG. 2A shows a plan view of an intermediate assembly 200 used to assemble a support structure of an SMA actuator. The intermediate assembly 200 comprises a bearing sub-assembly 206 comprising a plurality of bearings 210, where the bearing sub-assembly 206 is provided on a support component 202. The intermediate assembly 200 may comprise the support component 202, a conductive component 204, and a bearing sub-assembly 206. The bearing sub-assembly 206 may comprise a sacrificial body portion, and a plurality of metallic bearings 210 held apart by the sacrificial body portion, where the sacrificial body portion is removable from the plurality of metallic bearings 210. The bearing sub-assembly 206 may be formed by etching a sheet of metallic material. The metallic bearings 210 are held apart from each other, and in the required position for attaching to the support component 202, by arms 214 of the sacrificial body portion. Each arm 214 comprises a partially-etched region 208 and a bearing 210. The partially-etched region 208 is thinner than the bearing 210. The bearing 210 has a thickness or height that means it protrudes from the support structure 200. The sacrificial body portion may comprise flexure arms 212 (only part of the flexure arms are shown here—the flexure arms 212 are also shown in FIGS. 3A and 3B). The flexure arms 212 may be used to hold and guide the bearing sub-assembly 206 into the required position on the support component 202. The flexure arms 212 allow the position of the bearing sub-assembly 206 above the support component 202 to be changed, while constraining lateral movement of the bearing sub-assembly 206 (i.e. movement in a 2D plane above the support component). The flexure arms 212 are flexible, such that the bearing sub-assembly 206 may be pushed down onto the support component 202 to achieve good contact between the base/bottom of the bearings 210 and partially-etched regions 208 and the support component 202 during the attachment process. The whole of the bearing sub-assembly 206 may be flexible.

The bearing sub-assembly 206 may be provided in a sheet of material (i.e. may be etched into the sheet of material). The bearing sub-assembly 206 may be attached to the sheet of material by the flexure arms 212. The bearing sub-assembly may be pushed onto the support component 202 from the sheet of material (which is enabled by the flexible flexure arms 212).

FIG. 2B shows a perspective view of the bearings 210 and partially-etched regions 208 attached to the support component 202, and detached from the body portion of the bearing sub-assembly 206. The partially-etched regions 208 are detached from the body portion (i.e. the arms 214) by mechanically cutting or laser cutting along lines 218. The partially-etched regions 208 have a lower height than the bearings 210 so that when the partially-etched regions 208 are cut from the arms 214 along lines 218, any burr that forms during the cutting process also has a lower height than the bearings 210.

Thus, embodiments of the present techniques provide a shape memory alloy (SMA) actuation apparatus comprising: a support structure 200; a moveable component supported on the support structure in a manner allowing movement of the moveable component relative to the support structure in two orthogonal directions perpendicular to a notional primary axis extending through the moveable component, the moveable component comprising a spring plate; and at least two shape memory alloy (SMA) actuator wires connected between the moveable component and the support structure and arranged to, on contraction, move the moveable component; wherein the support structure comprises a bearing sub-assembly 206 comprising: a sacrificial body portion, and a plurality of metallic bearings 210 arranged to allow movement of the plate of the moveable component relative to the support structure, the metallic bearings 210 held apart by the sacrificial body portion, the sacrificial body portion being removable from the plurality of metallic bearings 210 during manufacture/assembly of the SMA actuation apparatus.

The support structure of the SMA actuation apparatus comprises a support component 202, and the metallic bearings 210 are attached to the support component 202.

The support structure of the SMA actuation apparatus may comprise a conductive component 204 which is supported on, and attached to, the support component 202. The support component 202 must be electrically-isolated. Thus, the support component 202 may be formed of an insulator (e.g. a polymer) and the metallic bearings 210 may be attached to the support component 202 by an adhesive or electrically insulative adhesive. Alternatively, the support component 202 may be formed of a metal or metal alloy, and the conductive component 204 and the metallic bearings 210 may be attached to the support component 202 by an electrically insulative adhesive material.

Alternatively, the support component 202 may have a laminate structure, comprising an electrically insulative material provided on a metal structural layer, and the metallic bearings 210 may be attached to the support component 202 by adhering the metallic bearings 210 to the electrically insulative material. The metal structural layer may be formed of steel or stainless steel. The structural layer may have a thickness of less than or equal to 50 μm. The electrically insulative layer may be a polymer, such as parylene/a parylene polymer. The electrically insulative layer may have a thickness of less than or equal to 10 μm. In some cases, the electrically insulative material may be provided on both sides of the structural layer.

The metallic bearings 210 may be formed of any one of: a metal, a metal alloy, stainless steel, steel, bearing bronze, and phosphor bronze. It will be understood that these are just some example materials that may be used to form the metallic bearings 210.

The metallic bearings 210 may be coated with a friction-reducing or low-friction coating. For example, the metallic bearings 210 may be coated with any one of: a lubricant, a dry film lubricant, a diamond-like carbon coating, and hard chrome. Alternatively, a surface of the metallic bearings 210 which contacts the spring plate of the moveable component may be polished (by a mechanical polishing process, electro-polishing process or chemical polishing process). The polishing process may be performed while the metallic bearings 210 are still attached to the sacrificial body portion of the bearing sub-assembly.

In addition to coating/polishing the metallic bearings 210, or as an alternative to coating/polishing the metallic bearings 210, at least a side of the spring plate (of the moveable component) that is in contact with the metallic bearings 210 may be coated with a friction-reducing or low-friction coating. The side of the spring plate in contact with the metallic bearings 210 may be coated with any one of: a lubricant, a dry film lubricant, a diamond-like carbon coating, hard chrome, and a hard chrome plating. Alternatively, at least a side of the spring plate in contact with the metallic bearings 210 may be polished for friction reduction (by a mechanical polishing process, electro-polishing process or chemical polishing process).

The support structure 200 further comprises a conductive component 204 comprising wire attach structures 220 (e.g. crimps) for coupling one end of each SMA actuator wire to the support structure.

The conductive component 204 is attached to the support component 202.

The metallic bearings 210 may be attached to the support component 202 by: providing the bearing sub-assembly 206 on the support component 202; attaching the metallic bearings 210 to the support component 202; and detaching the metallic bearings 210 from the sacrificial body portion of the bearing sub-assembly 206 (along the detachment points/lines 218). The metallic bearings 210 may be detached from the sacrificial body portion of the bearing sub-assembly 206 by any one of: a mechanical cutting process, or laser cutting process.

In embodiments, the SMA actuation apparatus may be a camera apparatus further comprising an image sensor fixed to the support structure. The moveable component may comprise a camera lens element comprising at least one lens arranged to focus an image on the image sensor. In this case, the primary axis is the optical axis of the camera lens element. The moveable component may be moved to provide optical image stabilization.

In embodiments, the SMA actuation apparatus 400 may comprise a total of four SMA actuator wires.

FIGS. 3A and 3B show a schematic 300 of how the support structure 200 of FIG. 2B may be manufactured from several sheets of material. A first sheet of material 306 comprises a plurality of support components, where each support component is used to form one SMA actuation apparatus. A second sheet of material 304 comprises a plurality of conductive components. Each conductive component comprises wire attach structures (e.g. crimps) for coupling one end of each SMA actuator wire to the support structure. A third sheet of material 302 comprises a plurality of bearing sub-assemblies 206, each bearing sub-assembly 206 comprising a plurality of metallic bearings. Each bearing sub-assembly 206 is attached to the third sheet of material 302 by flexure arms 212. The entire third sheet of material 302, apart from the metallic bearings, may be considered the sacrificial body portion.

In FIGS. 3A and 3B the sheets of material 302, 304, 306 comprise five support component components, conductive components and bearing sub-assemblies, such that five support structures can be assembled for five SMA actuators. However, it will be understood that each sheet of material 302, 304, 306 may comprise any number of components. The sheets of material may be strips (as shown) comprising a row of components, or may comprise several rows (i.e. an array) of components.

The second sheet of material 304 is provided over the first sheet of material 306 such that each of the conductive components is provided on top of a support component. The first sheet of material 306 is attached to the second sheet of material 304. The second sheet of material 304 may be aligned over the first sheet of material 306 by aligning guiding features 312, 314 on the first and second sheets of material. One or more of the guiding features 312, 314 may be holes and a pin may be inserted through the holes to assist the alignment.

The third sheet of material 302 is provided over the second sheet of material 304 and aligned to the, now attached, first and second sheets of material 304, 306. The metallic bearings of each bearing sub-assembly 206 of the third sheet of material 302 are attached to the support component components. Several support structures are now assembled and may be detached from the sheets of material as and when required to assemble an SMA actuator.

Figure 4:
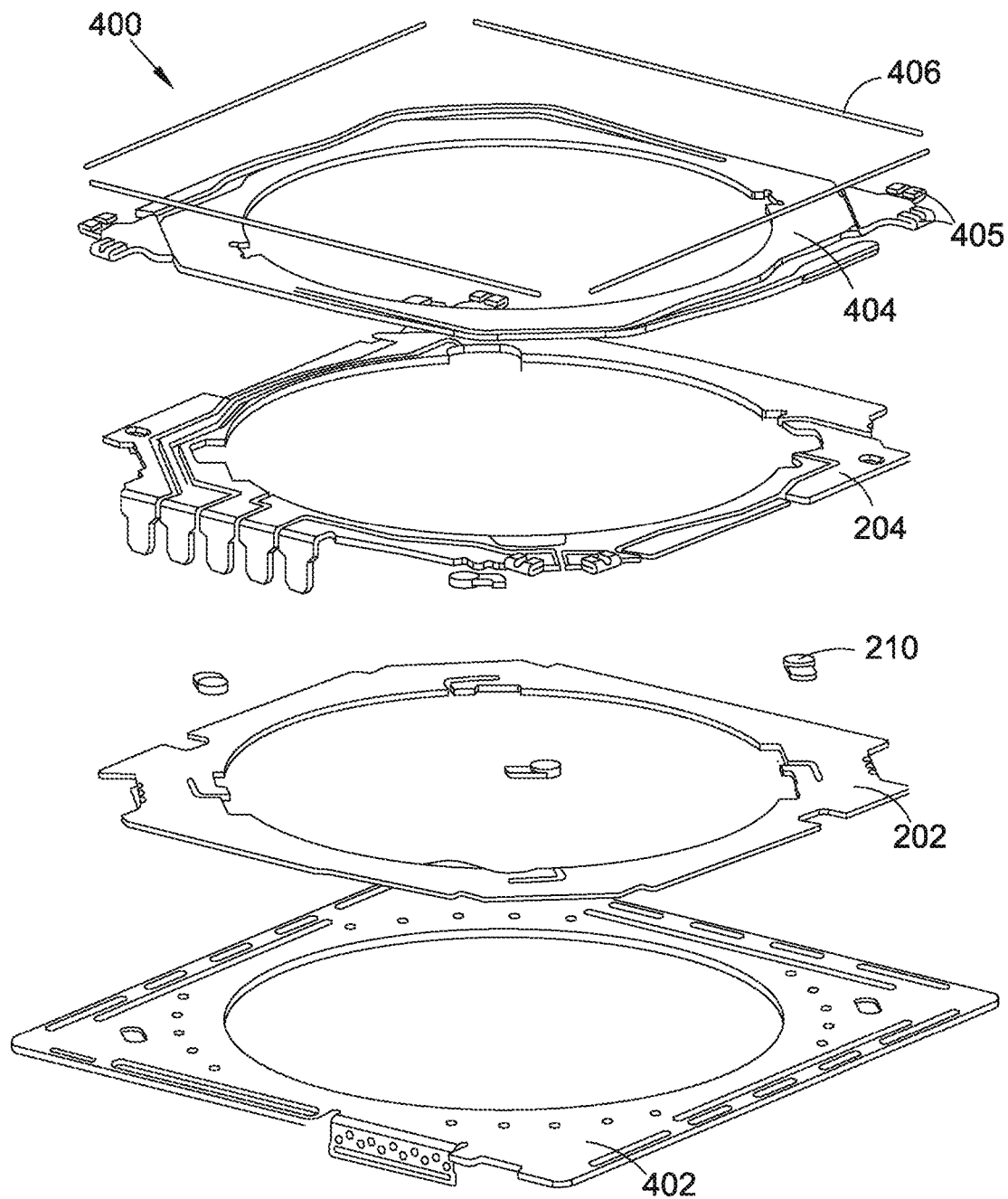
FIG. 4 shows layers of an actuator comprising a support component with separate bearings.

FIG. 4 shows an exploded view of layers of an SMA actuator 400 comprising separate bearings 210. The SMA actuator 400 comprises a support structure comprising a support component 202 and a conductive component 204. Bearings 210 are attached to support component 202. The support component 202 may be attached to a base layer 402. The SMA actuator 400 comprises a spring plate 404 of a moveable component. The spring plate 404 is connected to wire attach structures/crimps 405. The spring plate 404 is in contact with the bearings 210, such that the spring plate 404 (and therefore the moveable component) is moveable relative to the support structure. The SMA actuator 400 comprises SMA actuator wires 406, which are each attached at one end to wire attach structures/crimps 405 moveable component and at another end to wire attach structures/crimps of the conductive component 204.

Figure 5:
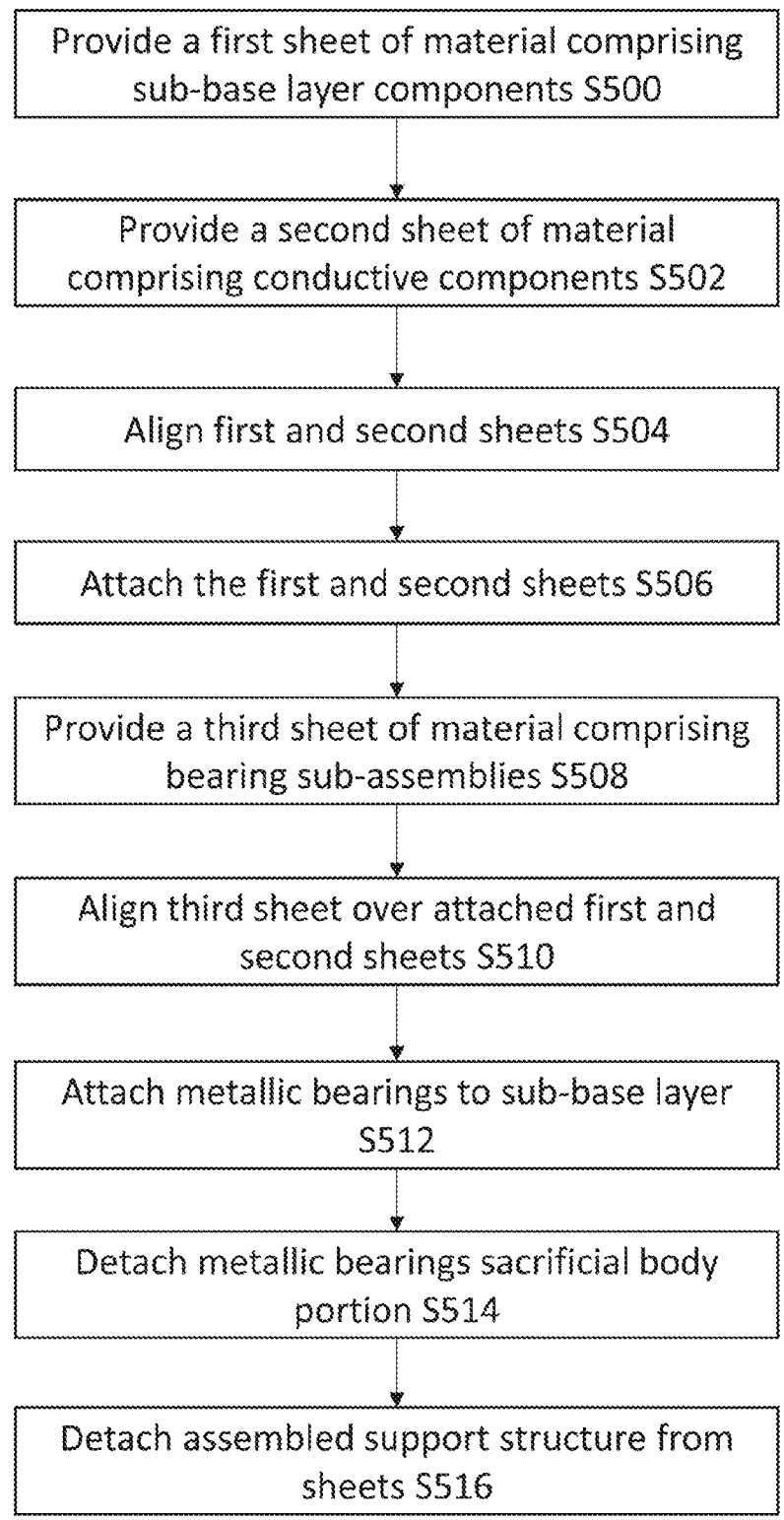
FIG. 5 shows a flowchart of example steps to assemble a support structure of an SMA actuator.

FIG. 5 shows a flowchart of example steps to assemble a support structure of an SMA actuator. The process begins by providing a first sheet of material comprising a plurality of support component components (step S500), and providing a second sheet of material comprising a plurality of conductive components (step S502). The process comprises aligning the second sheet of material over the first sheet of material such that each of the conductive components is provided on top of a support component (step S504), and attaching the first sheet of material to the second sheet of material to form a plurality of support structures each comprising a conductive component attached to a support component (step S506).

The step S504 of aligning the second sheet of material over the first sheet of material may comprise aligning guiding features on the first and second sheets of material.

Once the first and second sheets of material have been attached, the process comprises providing a third sheet of material comprising a plurality of bearing sub-assemblies (step S508), and aligning the third sheet of material on the attached first and second sheets of material where each bearing sub-assembly is provided on top of a support structure (step S510).

The process comprises attaching the plurality of metallic bearings of each bearing sub-assembly on the corresponding support structure (step S512). The attachment process may comprise adhering the metallic bearings to the support component.

The process comprises detaching the metallic bearings from the sacrificial body portion of each bearing sub-assembly (step S514), and then detaching the assembled support structures from the sheets of material (step S516).

An alternative solution to the above-described problems is to provide a support component with integrated bearings. This solution avoids the need to position the bearings on the support component, and for separate pieces of material to be used to form the bearings. Thus, the solution may provide a cheaper and easier to assemble SMA actuator.

Figure 6:
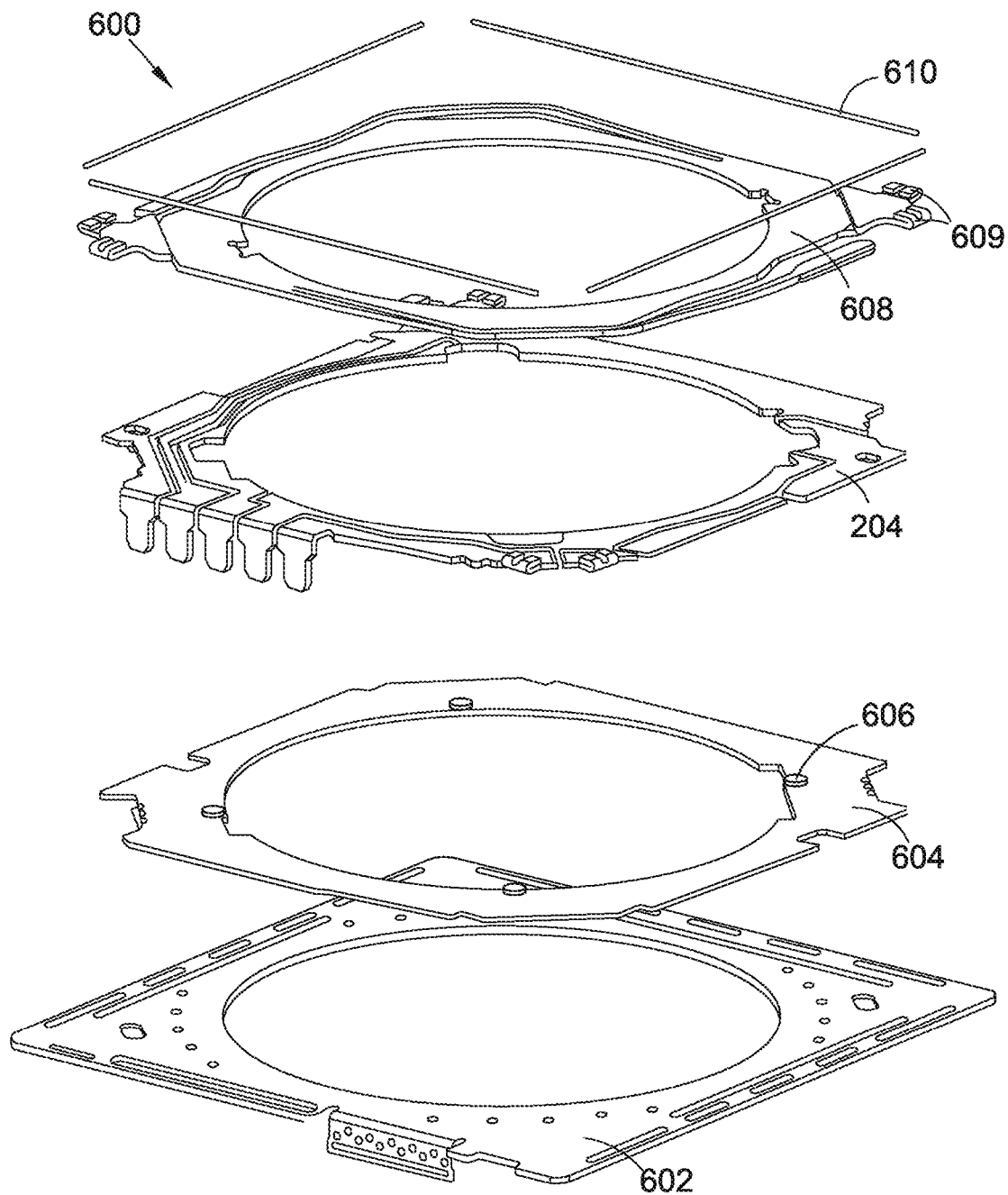
FIG. 6 shows layers of an actuator comprising a support component with integrated bearings.

FIG. 6 shows an exploded view of layers of an SMA actuator 600 comprising integrated bearings 606. The SMA actuator 600 comprises a support structure comprising a support component 604 and a conductive component 204. Integrated bearings 606 are formed in the support component 604. The integrated bearings 606 may be formed by partially-etching the support component 604 (e.g. using a laser etching or chemical etching process). Thus, much of the material of the support component 604 is removed by the partial-etching process to form the integrated bearings 606. The support component 604 may be attached to a base layer 602. The SMA actuator 600 comprises a spring plate 608 of a moveable component. The spring plate 608 is attached to wire attach structures/crimps 609. The spring plate 608 is in contact with the integrated bearings 606, such that the spring plate 608 (and therefore the moveable component) is moveable relative to the support structure. The SMA actuator 600 comprises SMA actuator wires 610, which are each attached at one end to wire attach structures/crimps of the moveable component and at another end to wire attach structures/crimps of the conductive component 204.

Thus, embodiments of the present techniques provide a shape memory alloy (SMA) actuation apparatus comprising: a support structure; a moveable component supported on the support structure in a manner allowing movement of the moveable component relative to the support structure in two orthogonal directions perpendicular to a notional primary axis extending through the moveable component, the moveable component comprising a spring plate 608; and at least two shape memory alloy (SMA) actuator wires 610 connected between the moveable component and the support structure and arranged to, on contraction, move the moveable component; wherein the support structure comprises: a support component 604 comprising a plurality of integrated bearings 606 arranged to allow movement of the moveable component relative to the support structure.

The integrated bearings 606 may be raised portions formed in a surface of the support component 604.

The support structure of the SMA actuation apparatus may comprise a conductive component 204 which is supported on, and attached to, the support component 604. The support component 604 must be electrically-isolated. Thus, the support component 604 may have a laminate structure comprising an electrically insulative material provided on a metallic structural layer. The structural layer may be formed of steel or stainless steel. The structural layer may have a thickness of less than or equal to 50 μm. The electrically insulative layer may have a thickness of less than or equal to 10 μm. In some cases, the electrically insulative material may be provided on both sides of the structural layer. The electrically insulative material may be a hard-wearing, low friction and insulative material (but not a polymer). Example suitable materials include a diamond-like carbon coating (DLC), tungsten-DLC and a tungsten carbon carbide coating (WC/C). In embodiments, a single material may be both low friction and insulating. In embodiments, the metal structural layer may be coated with a first material which is electrically insulative, and a second material which is low friction.

At least the integrated bearings 606 of the support component 604 may be coated with a friction-reducing or low-friction coating. The integrated bearings 606 may be coated with any one of: a lubricant, a dry film lubricant, a diamond-like carbon coating, hard chrome, and a hard chrome plating. Additionally or alternatively, at least a side of the spring plate 608 in contact with the integrated bearings 606 may be coated with a friction-reducing or low-friction coating. The side of the spring plate 608 in contact with the integrated bearings 606 may be coated with any one of: a lubricant, a dry film lubricant, a diamond-like carbon coating, hard chrome, and a hard chrome plating. Alternatively, at least a side of the spring plate 608 in contact with the integrated bearings 606 may be polished for friction reduction.

Figure 7:
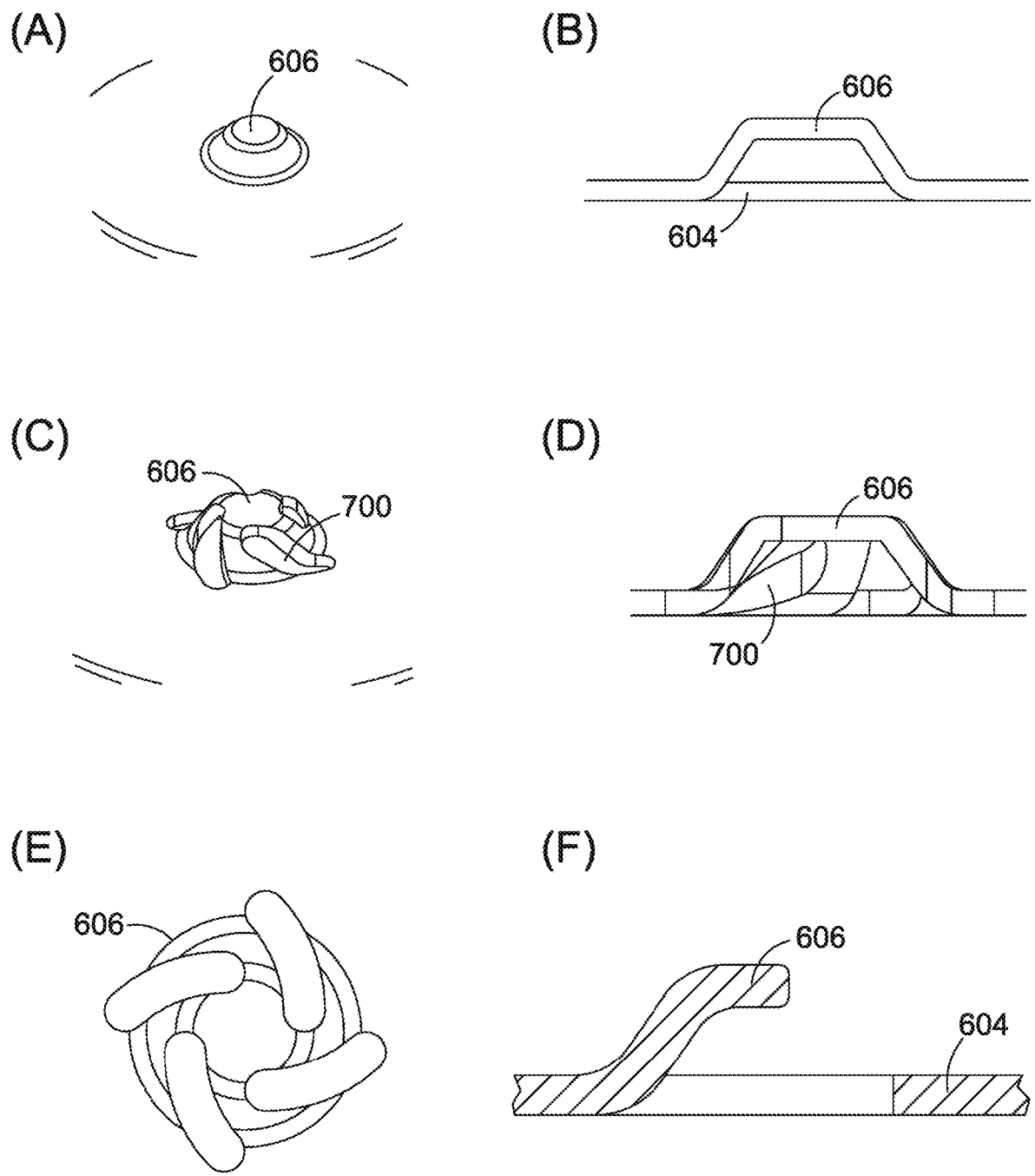
FIGS. 7A to 7F show various forms of integrated bearings.

FIGS. 7A to 7F show various forms of integrated bearings 606. It will be understood that these are just some examples of the form/shape of the integrated bearings 606 and are non-limiting. FIG. 7A shows a perspective view of an integrated bearing 606 that has a raised boss-like structure, and FIG. 7B shows how the raised boss 606 may be formed from the support component 604. The raised bosses 606 could be created by using a metal forming process on a support component 604 which is formed of a thin sheet of metal. The raised bosses 606 may be formed by domed impressions or structures in the base layer 602: when the support component 604 is attached to the base layer 602, the domed structures of the base layer 602 may cause the raised bosses 606 to be formed.

In some cases, forming a raised boss may be difficult. FIGS. 7C to 7E show how an integrated bearing 606 may be formed by etching reliefs 700 into the material of the support component 604 such that the bearing 606 may be formed without tearing the material.

FIG. 7F shows how an integrated bearing 606 may be formed by etching/cutting a tab into the support component 604, and forming-up the tab (e.g. using a two bend-point forming operation) to provide a bearing 606. This type of integrated bearing 606 may be weaker than the bearings shown in FIGS. 7A to 7E.

Thus, in embodiments, the integrated bearings 606 may be formed by partially-etching the support component 604. Alternatively, the integrated bearings 606 may be provided by forming raised portions in a surface of the support component 604. Alternatively, the integrated bearings 606 may be provided by etching and forming raised portions in a surface of the support component 604. Alternatively, the integrated bearings 606 may be provided by cutting tab portions in the support component 604 and forming-up the tab portions.

The support structure may further comprise a conductive component 204 comprising wire attach structures for coupling one end of each SMA actuator wire to the support structure. The conductive component 204 is attached to the support component 604.

In embodiments, the SMA actuation apparatus may be a camera apparatus further comprising an image sensor fixed to the support structure. The moveable component may comprise a camera lens element comprising at least one lens arranged to focus an image on the image sensor. In this case, the primary axis is the optical axis of the camera lens element. The moveable component may be moved to provide optical image stabilization.

In embodiments, the SMA actuation apparatus 600 may comprise a total of four SMA actuator wires.

Figure 8:
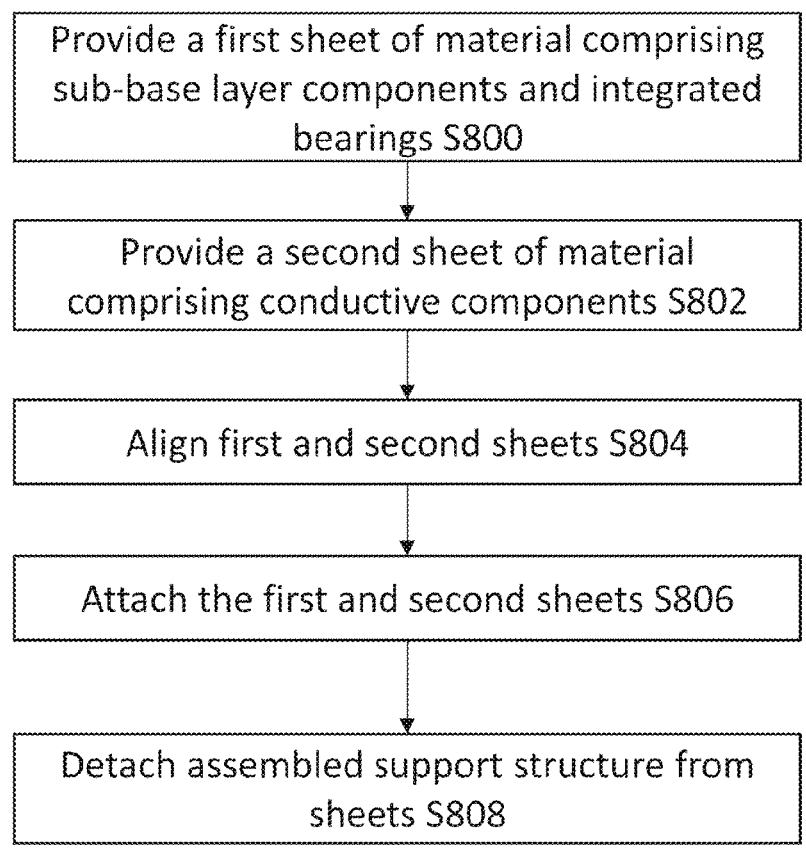
FIG. 8 shows a flowchart of example steps to assemble a support structure of an SMA actuator.

FIG. 8 shows a flowchart of example steps to assemble a support structure of an SMA actuator. The process comprises providing a first sheet of material comprising a plurality of support components, each support component comprising a plurality of integrated bearings (step S800), and providing a second sheet of material comprising a plurality of conductive components (step S802). The process comprises aligning the second sheet of material over the first sheet of material such that each of the conductive components is provided on top of a support component (step S804). The first sheet of material is attached to the second sheet of material to form a plurality of support structures each comprising a conductive component attached to a support component (step S806). The process then comprises detaching, from the attached first and second sheets of material, a support structure (step S808).

A moveable component is then provided on the assembled support structure and supported on the support structure in a manner allowing movement of the moveable component relative to the support structure in two orthogonal directions perpendicular to a notional primary axis extending through the moveable component, the moveable component comprising a spring plate arranged to contact the integrated bearings of the support structure.

At least two shape memory alloy (SMA) actuator wires are then connected between the moveable component and the support structure and arranged to, on contraction, move the moveable component.

Embodiments of the present techniques provide an SMA four-wire actuator assembly comprising three or more bearings to allow movement of the moveable element on a support structure wherein the bearings are assembled into the actuator from an etched component which is subsequently de-tabbed.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognize that present techniques have a broad range of applications, and that the embodiments may take a wide range of modifications without departing from any inventive concept as defined in the appended claims.

The invention claimed is:

1. A shape memory alloy (SMA) actuation apparatus comprising:
 a support structure;

a moveable component supported on the support structure in a manner allowing movement of the moveable component relative to the support structure in two orthogonal directions perpendicular to a notional primary axis extending through the moveable component, the moveable component comprising a spring plate; and at least two shape memory alloy (SMA) actuator wires connected between the moveable component and the support structure and arranged to, on contraction, move the moveable component;

wherein the support structure comprises a bearing sub-assembly comprising:
a sacrificial body portion, and
a plurality of metallic bearings arranged to allow movement of the plate of the moveable component relative to the support structure, the metallic bearings held apart by the sacrificial body portion,
the sacrificial body portion being removable from the plurality of metallic bearings during manufacture/assembly of the SMA actuation apparatus.

2. The SMA actuation apparatus as claimed in claim 1 wherein the support structure further comprises a support component, and the metallic bearings are attached to the support component.

3. The SMA actuation apparatus as claimed in claim 2 wherein the support component is formed of a polymer and the metallic bearings are attached to the support component by an adhesive.

4. The SMA actuation apparatus as claimed in claim 2 wherein the support component is formed of a metal or metal alloy, and the metallic bearings are attached to the support component by an electrically insulative adhesive.

5. The SMA actuation apparatus as claimed in claim 4 wherein the support component is formed of steel.

6. The SMA actuation apparatus as claimed in claim 2 wherein the support component has a laminate structure, comprising an electrically insulative material provided on a structural layer, and the metallic bearings are attached to the support component by adhering the metallic bearings to the electrically insulative material.

7. The SMA actuation apparatus as claimed in claim 6 wherein the structural layer is formed of steel.

8. The SMA actuation apparatus as claimed in claim 6 wherein the structural layer has a thickness of less than or equal to 50 μm.

9. The SMA actuation apparatus as claimed in claim 6 wherein the electrically insulative layer is a polymer.

10. The SMA actuation apparatus as claimed in claim 9 wherein the electrically insulative layer is parylene.

11. The SMA actuation apparatus as claimed in claim 6, wherein the electrically insulative layer has a thickness of less than or equal to 10 μm.

12. The SMA actuation apparatus as claimed in claim 6, wherein the electrically insulative material is provided on both sides of the structural layer.

13. The SMA actuation apparatus as claimed in claim 1, wherein the metallic bearings are formed of any one of: a metal, a metal alloy, stainless steel, steel, bearing bronze, and phosphor bronze.

14. The SMA actuation apparatus as claimed in claim 1, wherein the metallic bearings are coated with a friction-reducing or low-friction coating.

15. The SMA actuation apparatus as claimed in claim 14 wherein the metallic bearings are coated with any one of: a lubricant, a dry film lubricant, a diamond-like carbon coating, hard chrome, and a tungsten carbon carbide coating.

16. The SMA actuation apparatus as claimed in claim 1, wherein a surface of the metallic bearings in contact with the spring plate is polished for friction reduction.

17. The SMA actuation apparatus as claimed in claim 1, wherein at least a side of the spring plate in contact with the metallic bearings is coated with a friction-reducing or low-friction coating.

18. The SMA actuation apparatus as claimed in claim 17 wherein the side of the spring plate in contact with the metallic bearings is coated with any one of: a lubricant, a dry film lubricant, a diamond-like carbon coating, hard chrome, and a tungsten carbon carbide coating.

19. The SMA actuation apparatus as claimed in claim 1, wherein at least a side of the spring plate in contact with the metallic bearings is polished for friction reduction.

20. The SMA actuation apparatus as claimed in claim 2, wherein the support structure further comprises a conductive component comprising wire attach structures for coupling one end of each SMA actuator wire to the support structure.

21. The SMA actuation apparatus as claimed in claim 20 wherein the conductive component is attached to the support component.

22. The SMA actuation apparatus as claimed in claim 2, wherein the metallic bearings are attached to the support component by:
providing the bearing sub-assembly on the support component;
attaching the metallic bearings to the support component; and
detaching the metallic bearings from the sacrificial body portion of the bearing sub-assembly.

23. The SMA actuation apparatus as claimed in claim 22 wherein the metallic bearings are detached from the sacrificial body portion of the bearing sub-assembly by any one of: a mechanical cutting process, or a laser cutting process.

24. The SMA actuation apparatus as claimed in claim 1, wherein the SMA actuation apparatus is a camera apparatus further comprising an image sensor fixed to the support structure, and the moveable component comprises a camera lens element comprising at least one lens arranged to focus an image on the image sensor, the primary axis being the optical axis of the camera lens element.

25. The SMA actuation apparatus as claimed in claim 24 wherein the moveable component is moved to provide optical image stabilisation.

26. The SMA actuation apparatus as claimed in claim 1, comprising a total of four SMA actuator wires.

27. A shape memory alloy (SMA) actuation apparatus comprising:
a support structure comprising wire attach structures and a support component separate from the wire attach structures;
a moveable component supported on the support structure in a manner allowing movement of the moveable component relative to the support structure in two orthogonal directions perpendicular to a notional primary axis extending through the moveable component, the moveable component comprising a spring plate; and
at least two shape memory alloy (SMA) actuator wires connected between the moveable component and the wire attach structures of the support structure and arranged to, on contraction, move the moveable component;
the support component comprising a plurality of integrated bearings integrally formed with the support component arranged to allow movement of the moveable component relative to the support structure.

28. The SMA actuation apparatus as claimed in claim 27 wherein the integrated bearings are raised portions formed in a surface of the support component.

29. The SMA actuation apparatus as claimed in claim 27 wherein the support component has a laminate structure comprising an electrically insulative material provided on a metal structural layer.

30. The SMA actuation apparatus as claimed in claim 29 wherein the metal structural layer is formed of steel or stainless steel.

31. The SMA actuation apparatus as claimed in claim 29 wherein the metal structural layer has a thickness of less than or equal to 50 µm.

32. The SMA actuation apparatus as claimed in claim 29, wherein the electrically insulative layer has a thickness of less than or equal to 10 µm.

33. The SMA actuation apparatus as claimed in claim 29, wherein the electrically insulative material is provided on both sides of the structural layer.

34. The SMA actuation apparatus as claimed in claim 27, wherein at least the integrated bearings of the support component are coated with a friction-reducing or low-friction coating.

35. The SMA actuation apparatus as claimed in claim 34 wherein the integrated bearings are coated with any one of: a lubricant, a dry film lubricant, a diamond-like carbon coating, hard chrome, and a tungsten carbon carbide coating.

36. The SMA actuation apparatus as claimed in claim 29, wherein at least a side of the spring plate in contact with the integrated bearings is coated with a friction-reducing or low-friction coating.

37. The SMA actuation apparatus as claimed in claim 36 wherein the side of the spring plate in contact with the integrated bearings is coated with any one of: a lubricant, a dry film lubricant, a diamond-like carbon coating, hard chrome, and a tungsten carbon carbide coating.

38. The SMA actuation apparatus as claimed in claim 29, wherein at least a side of the spring plate in contact with the integrated bearings is polished for friction reduction.

39. The SMA actuation apparatus as claimed in claim 29, wherein the integrated bearings are provided by forming raised portions in a surface of the support component.

40. The SMA actuation apparatus as claimed in claim 29, wherein the integrated bearings are formed by partially-etching the support component.

41. The SMA actuation apparatus as claimed in claim 29, wherein the integrated bearings are provided by etching and forming raised portions in a surface of the support component.

42. The SMA actuation apparatus as claimed in claim 29, wherein the integrated bearings are provided by cutting tab portions in the support component and forming-up the tab portions.

43. The SMA actuation apparatus as claimed in claim 29, wherein the support structure further comprises a conductive component comprising wire attach structures for coupling one end of each SMA actuator wire to the support structure.

44. The SMA actuation apparatus as claimed in claim 43 wherein the conductive component is attached to the support component.

45. The SMA actuation apparatus as claimed in, claim 29, wherein the SMA actuation apparatus is a camera apparatus further comprising an image sensor fixed to the support structure, and the moveable component comprises a camera lens element comprising at least one lens arranged to focus an image on the image sensor, the primary axis being the optical axis of the camera lens element.

46. The SMA actuation apparatus as claimed in claim 45 wherein the moveable component is moved to provide optical image stabilisation.

47. The SMA actuation apparatus as claimed in claim 29, comprising a total of four SMA actuator wires.

48. A method for manufacturing a shape memory alloy (SMA) actuation apparatus comprising:
providing a first sheet of material comprising a plurality of support components, each support component comprising a plurality of integrated bearings formed integrally with the respective support component;
providing a second sheet of material comprising a plurality of conductive components;
aligning the second sheet of material over the first sheet of material such that each of the conductive components is provided on top of a support component; and
attaching the first sheet of material to the second sheet of material to form a plurality of support structures each comprising a conductive component attached to a support component;
detaching, from the attached first and second sheets of material, a support structure, the support structure comprising a wire attach structure separate from the support component;
providing a moveable component supported on the support structure in a manner allowing movement of the moveable component relative to the support structure in two orthogonal directions perpendicular to a notional primary axis extending through the moveable component, the moveable component comprising a spring plate arranged to contact the integrated bearings of the support structure; and
providing at least two shape memory alloy (SMA) actuator wires connected between the moveable component and the wire attach structure of the support structure and arranged to, on contraction, move the moveable component.

* * * * *